United States Patent

[11] 3,608,975

| [72] | Inventors | Webster Morrill Sawyer<br>Houston;<br>Erroll Vernon Seymour, Houston; Moye<br>Wicks, III, Houston, Tex.; Lewis Philip<br>Reiss, Denver, Colo. |
|---|---|---|
| [21] | Appl. No. | 860,351 |
| [22] | Filed | Sept. 23, 1969 |
| [45] | Patented | Sept. 28, 1971 |
| [73] | Assignee | Shell Oil Company<br>New York, N.Y. |

[54] LIQUID INJECTION ARRANGEMENT FOR PREVENTING PIPELINE SLUMPING
8 Claims, 3 Drawing Figs.

[52] U.S. Cl..................................................... 302/14, 302/66
[51] Int. Cl....................................................... B65g 53/30

[50] Field of Search........................................... 302/14, 15, 16, 66

[56] References Cited
UNITED STATES PATENTS

| 562,232 | 6/1896 | Miller............................. | 302/14 |
| 1,563,200 | 11/1925 | Leicknam...................... | 302/66 |
| 2,631,899 | 3/1953 | Jullien........................... | 302/14 |
| 2,920,923 | 1/1960 | Wasp et al...................... | 302/66 |

Primary Examiner—Andres H. Nielsen
Attorneys—Thomas R. Lampe and J. H. McCarthy

ABSTRACT: Method and apparatus for preventing downhill slumping in a shutdown slurry pipeline wherein a liquid is injected into the pipeline at those locations where slumping and plug formation by the slurry solid phase is likely to occur. Slurry material is removed from upper elevations of the line substantially simultaneously with the injection of the liquid.

PATENTED SEP 28 1971 3,608,975
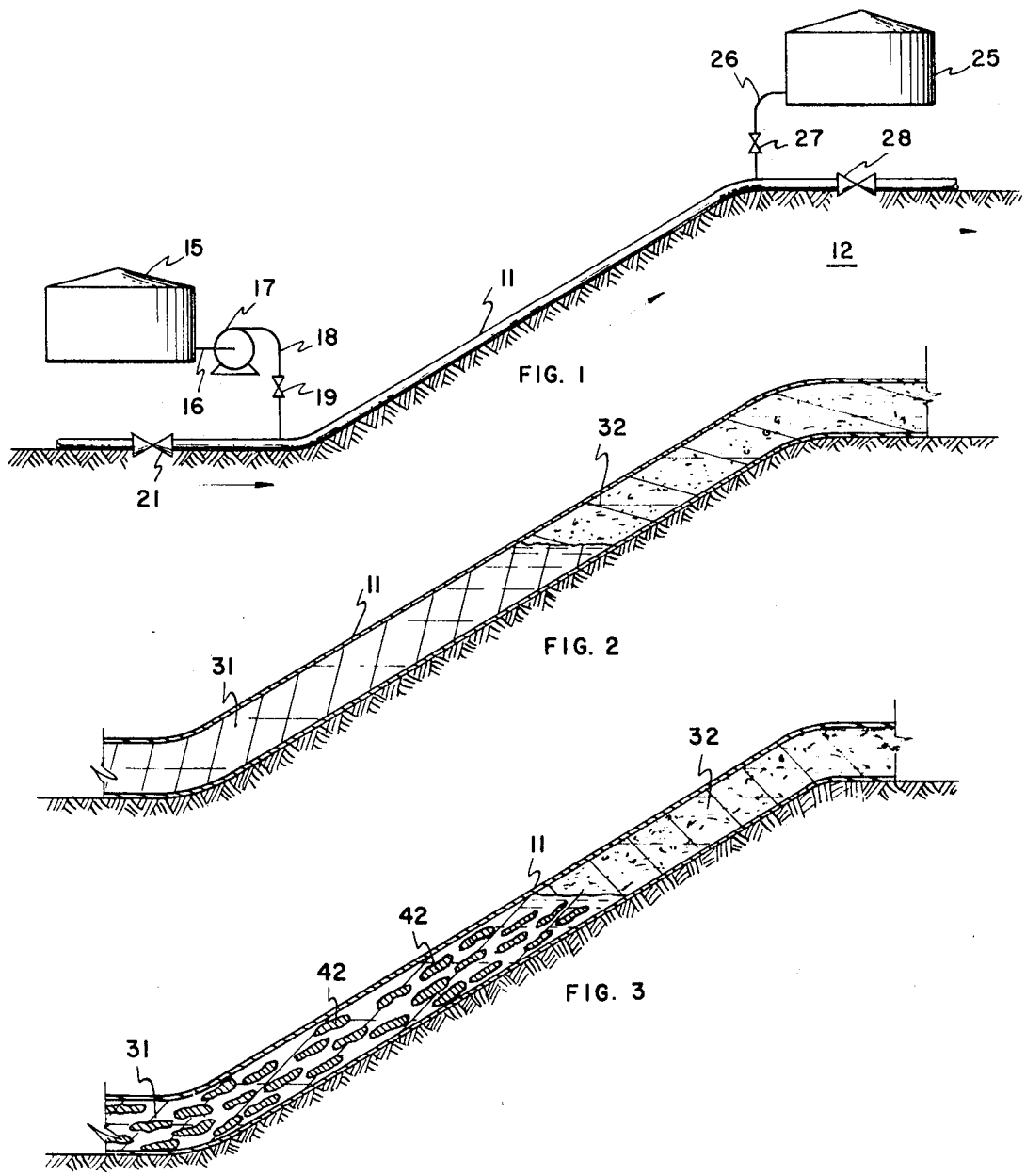
INVENTORS:
L. P. REISS
W. M. SAWYER
E. V. SEYMOUR
MOYE WICKS, III
BY:
THEIR ATTORNEY

LIQUID INJECTION ARRANGEMENT FOR PREVENTING PIPELINE SLUMPING

The present invention relates to pipeline transport operations; and, more particularly, to a method and apparatus for preventing the downward movement of slurry solids in an inclined portion of pipeline during a shutdown period.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems arise when such materials are moved through pipelines inclined to go over a hill or down into a valley. At these locations, during a planned or emergency line shutdown, the solids of the transported slurry may settle out vertically and subsequently slide down the inclined portions of the pipeline, thereby causing a compacted plug which may be very difficult to dislodge and move when line shutdown is terminated and transport activities are resumed.

These difficulties can sometimes be avoided by laying solids-carrying or slurry pipelines so that they do not exceed a slope or angle of inclination above which sliding occurs. Alternatively, the pipeline can be emptied at each shutdown. Obviously, these alternative prior art approaches are not always feasible or economical, especially in those situations where long and relatively steep slopes are encountered. Slopes of this nature are being encountered with increasing frequency as pipeline operations are being extended to new relatively inaccessible mountainous areas in the United States and elsewhere.

SUMMARY OF THE INVENTION

It is therefore a primary object of the present invention to provide an improved and economical apparatus and method whereby slurry material being transported in an inclined pipeline section is prevented from slumping during a line shutdown.

This and other objects have been attained in the present invention by providing a method and apparatus for preventing downhill slumping in a shutdown slurry pipeline wherein a liquid is injected into lower elevations of the pipeline when the slurry flow rate falls below some predetermined value. When the slurry comprises sulfur suspended in oil, for example, the injected liquid may be water. While the liquid is being injected into the line, slurry material is removed from upper elevations of the pipeline into a storage tank.

DESCRIPTION OF THE DRAWING

The above-noted and other objects of the present invention will be understood from the following description, taken with reference to the accompanying drawing. In describing the invention in detail, reference will be made to the drawing in which like reference numerals designate corresponding parts throughout several views in which:

FIG. 1 is a diagrammatic view illustrating a given length of slurry pipeline which has been modified in accordance with the teachings of the present invention;

FIG. 2 is an enlarged cross-sectional view in longitudinal projection illustrating a portion of the pipeline section of FIG. 1 with the slurry transported within the pipeline shown being displaced by liquid which has been injected into the pipeline; and FIG. 3 is a view similar to that of FIG. 2 but illustrating the condition where the injected fluid has a density less than the density of a slurry.

Referring now to FIG. 1, a given length of slurry pipeline 11 is illustrated in the position assumed thereby as the pipeline proceeds from a low elevation up a hill or mountain 12. The terrain illustrated is typical of that encountered in pipeline-laying activities, although it should be understood that the teachings of the present invention may be carried out in any topographical configuration wherein a portion of slurry pipeline is horizontal inclined.

The transportation of slurries consisting of solid particles in a fluid medium by use of pipelines similar to that disclosed in FIG. 1 is quite well known, and such expedient is finding increasing use, especially in those situations where the source of raw materials is relatively remote and inaccessible from the point of delivery, which may be a suitable processing plant, for example. In the disclosed arrangement, it may be assumed for purposes of illustration that the slurry material being transferred through pipeline 11 as by means of conventional pumps (not shown) is moving through the line in the direction indicated by the arrows. However, the teachings of the present invention are, of course, applicable regardless of the direction of flow of the slurry.

As long as flow continues at or above some critical rate in the pipeline, the solid matter of the slurry will remain in suspension within the pumped liquid, even when the solid matter has a higher specific gravity than the liquid. If, however, the flow is stopped for any reason, i.e., the pipeline is shut down, such solid matter will settle out of suspension. In the situation where the line is horizontal or the slope of the line is insufficient to cause sliding of the settled solids, no problem is created by such settling out. Under these conditions, a liquid-rich channel remains open at the top of the line which allows the settled material to be resuspended with a minimum of difficulty upon resumption of slurry flow.

A serious problem can exist when the pipeline must be inclined to go over a hill or down a valley, as illustrated, for example, in FIG. 1. At these locations, the settling of solids followed by their sliding down the slope during a protracted shutdown can result in a compacted plug of material difficult, if not impossible, to move or resuspend by normal operating procedures. In the illustrated pipeline configuration, such solids would slide downwardly from hill or mountain 12 into a low point of the line. The solid material would then compress under its own weight to form a plug in the valley in an obvious manner.

Such plug formation is prevented in accordance with the teachings of the present invention as follows. Disposed adjacent to a low point in pipeline 11 is a suitable source of fluid, such as supply tank 15, having an outlet pipe 16 extending therefrom which in turn is operatively connected to the inlet of a high-pressure reversible pump 17 of any suitable commercial design. A conduit 18 extends from the outlet of pump 17 into communication with the interior of pipeline 11. A suitable valve 19 is disposed in conduit 18 to selectively terminate or allow fluid flow within conduit 18. Valve 19 may be either manually operable or be of a suitable conventional automatic type, responsive to flow line conditions in pipeline 11 to either open or close. Conduit 18 is connected to pipeline 11 at a low point in the pipeline between hill 12 and a further valve 21 which is disposed in pipeline 11 and adapted to selectively terminate or permit flow therein in the well-known manner. Valve 21 also may be of either the manually operable or automatic type.

Disposed adjacent to the upper elevation of pipeline 11 is a storage vessel or tank 25. A conduit 26 leads from the interior of tank 25 into communication with the throughbore defined by pipeline 11. A suitable valve 27 is disposed in conduit 26 to control flow therein. A valve 28 which may be similar in construction to valve 21 is disposed in pipeline 11 in the portion of the pipeline lying upon hill 12 and disposed on the side of conduit 26 opposite from the direction of tank 15 and its related equipment.

The operation of the above-described arrangement is as follows. For purposes of illustration, it will be assumed that the slurry being transported within pipeline 11 comprises a solid phase consisting of sulfur particles suspended in crude oil or any wholly or partially refined hydrocarbon liquid phase. In addition, it should be assumed that the liquid to be injected into the pipeline in accordance with the present invention is water. It is to be understood, however, that the principles of the present invention have application to a wide variety of slurry and injection-fluid materials.

When the flow rate of the slurry in pipeline 11 drops to zero, valve 19 (which is normally closed during slurry transport) is opened and pump 17 is actuated to pump water from tank 15 into the interior of pipeline 11. Substantially simultaneously with the opening of valve 19, valves 21 and 28 in pipeline 11 are closed so that the section of the pipeline between these latter valves is blocked or isolated from the remainder of the line. Valves 21 and 28 are, of course, in a normally open condition during slurry transport. One additional step is also carried out upon termination of slurry flow. Valve 27 which is disposed in conduit 26 and is in a closed condition during slurry transport, is opened, thereby providing a flow path between storage vessel or tank 25 and the pipeline interior.

Flow of the injection fluid—in this case, water—into the pipeline under pressure causes an uphill displacement of slurry material in the segment of the pipeline blocked by valves 21 and 28. In FIG. 2, for example, the water, indicated by means of reference numeral 31, is shown as displacing the slurry material 32. In FIG. 2 it should be understood that the condition illustrated is one wherein the slurry has a density of 1.0 gram/cc. or less and the plain water displaces the slurry in a gravity-stabilized pistonlike displacement. The mechanism by which this water displacement works depends strongly, of course, on the density of the water and sulfur slurry. While the density of ordinary water remains 1.0 gram/cc., the density of the oil-sulfur slurry will vary from that of the liquid (oil) phase thereof—approximately 0.8 gram/cc. to that of the solid (sulfur) phase—about 2.0 grams/cc.—depending upon the relative proportions of the solid and liquid phases. The density of the water can be increased by addition of a suitable soluble inorganic salt, e.g., calcium chloride, so that slurries of density up to 1.4 grams/cc. can be displaced in the pistonlike manner shown in FIG. 2. The displaced slurry flows through conduit 26 into storage tank 25 until sufficient quantities thereof have been removed from the pipeline to prevent formation of a plug in the line. At that point, pump 17 is deactivated and water injection is terminated.

To restart the pipeline, the above process can be reversed by reversing pump 17 to pump the water or other nonslurry liquid back into tank 15 with slurry flowing from tank 25 to accommodate the void created in the pipeline by such liquid removal. When the pipeline is refilled with slurry, valves 19 and 27 are closed, valves 21 and 28 are opened and pump 17 is once again deactivated. Normal slurry flow within pipeline 11 may be then resumed.

In the foregoing description a pump, i.e., pump 17, was disposed in operative association with the liquid-supply tank 15 and slurry material exited from storage tank 25 upon pipeline restart under the influence of gravity and the vacuum created within pipeline 11 by the withdrawal of the liquid. It should be readily understood, however, that a reversible pump could alternatively be disposed in operative association with slurry-storage tank 25 with liquid-supply tank 15 being in a position to feed liquid to pipeline 11 under the influence of gravity and the vacuum created in the pipeline by the pumping and removal of the slurry from pipeline 11 into storage tank 25.

Rather than remove the liquid, e.g. water from the pipeline, upon restart, an alternative restart procedure may be to simply displace the water or other liquid in the line to the pipeline terminal along with the slurry in the line. Slurry in storage tank 25 would be slowly bled into the pipeline after normal pipeline slurry flow is again under way either by being pumped or under the influence of gravity. The water or other liquid would be removed from the slurry at the pipeline terminal by conventional separation procedures. Supply tank 15, on the other hand, would be refilled with water or other suitable injection fluid from an external source.

It is possible that the slurry density will exceed that of the displacing injection fluid even with the addition of density-increasing additives as previously described. For this situation, which is shown in FIG. 3, for example, some slurry 32 may settle as globules 42 of slurry dispersed in the injection fluid 31, while the remainder of the slurry flows to a suitable storage vessel as previously described. If suitable surface-active agent additives are included in the injection fluid to prevent coalescence of these slurry globules, a stable injection fluid continuous phase will exist. In the situation where the slurry comprises an oil phase and a sulfur phase and the injection fluid is water, for example, it is unlikely that the sulfur will separate from the oil and transfer to the water as the sulfur is preferentially wet by oil. The mixture of slurry globules in the water will still require only low restart pressures as this mixture will have a viscosity similar to that of water. With this type of mixture in the pipeline, the preferred restart technique would probably be to displace the contents of the line all the way to the pipeline terminal as in the alternate restart approach referred to above.

It is to be understood, of course, that in the situation where the injection fluid is water the addition of suitable additives to the water may be required to reduce corrosion and/or prevent freezing. Any of the common corrosion inhibitors, chromates, etc., and antifreezes, glycol, etc., may be used as long as these additives do not interfere with the preferred wettability of the slurry solid phase, e.g., sulfur by the slurry liquid phase, e.g., oil.

We claim as our invention:

1. Apparatus in combination with a pipeline used to transport slurry material including a solid phase and a liquid phase, said pipeline including a first portion and a second portion elevated with respect to said first portion, said apparatus comprising:
    means for introducing a liquid into the interior of said first pipeline portion upon shutdown of said pipeline;
    means for withdrawing slurry from said second pipeline portion substantially simultaneously with the introduction of said liquid into said first pipeline portion whereby insufficient slurry material will remain in said pipeline to slump and form a plug under the influence of gravity; and
    means for isolating the interiors defined by said first and second pipeline portions from the remainder of said pipeline during the introduction of said liquid into said first pipeline portion and the withdrawal of said slurry from said second pipeline portion.

2. The apparatus of claim 1 wherein said means for introducing a liquid comprises:
    liquid storage means;
    means defining a flow path between said storage means and the interior of said first pipeline portion; and
    means for selectively establishing communication between said liquid-storage means and the interior of said first pipeline portion.

3. The apparatus of claim 1 wherein said means for withdrawing slurry from said second pipeline portion includes conduit means leading from the interior of said second pipeline portion and slurry-storage means operatively connected to the other end of said conduit means.

4. A method of preventing downhill slumping and plug formation by slurry solid-phase material under the influence of gravity in a shutdown slurry pipeline, said method comprising the steps of:
    introducing a liquid into a low point in said pipeline upon termination of slurry flow; and
    substantially simultaneously removing slurry from an adjacent high point in said pipeline whereby said liquid flows into an inclined section of pipeline between said high point and said low point.

5. The method according to claim 4 wherein said slurry is a mixture of oil and sulfur and said fluid is at least partially comprised of water.

6. The method according to claim 5 wherein soluble inorganic salts are added to the water prior to introduction of the water into the pipeline to increase the density of the fluid.

7. The method according to claim 5 wherein surface-active agents are added to the water prior to introduction into said pipeline to prevent coalescence of any discontinuous slurry globules mixed with said fluid.

8. A method of preventing downhill slumping and plug formation by slurry solid-phase material under the influence of gravity in a shutdown slurry pipeline, said method comprising steps of:

isolating the interior of the pipeline between a high point and a low point from the remainder of the pipeline interior as slurry flow is terminated;

introducing a liquid into said low point in said pipeline upon termination of said slurry flow; and substantially simultaneously removing slurry from the adjacent high point in said pipeline whereby said liquid flows into an inclined section of pipeline between said high point and said low point.